US009994002B2

(12) United States Patent
Bhattacharya et al.

(10) Patent No.: US 9,994,002 B2
(45) Date of Patent: Jun. 12, 2018

(54) POLYMER COMPOSITION FOR HIGH CLARITY LAMINATE, PROCESS OF MANUFACTURE AND APPLICATIONS THEREOF

(75) Inventors: Satya Prasad Bhattacharya, Mumbai (IN); Mrinal Kanti Banjerjee, Mumbai (IN)

(73) Assignee: Essel Propack Ltd., Mumbai, Maharashtra (IN)

( * ) Notice: Subject to any disclaimer, the term of this patent is extended or adjusted under 35 U.S.C. 154(b) by 634 days.

(21) Appl. No.: 14/009,122

(22) PCT Filed: May 23, 2012

(86) PCT No.: PCT/IB2012/000999
§ 371 (c)(1),
(2), (4) Date: Oct. 1, 2013

(87) PCT Pub. No.: WO2012/160436
PCT Pub. Date: Nov. 29, 2012

(65) Prior Publication Data
US 2014/0030498 A1 Jan. 30, 2014

(30) Foreign Application Priority Data

May 23, 2011 (IN) .......................... 1553/MUM/2011

(51) Int. Cl.
| B32B 27/08 | (2006.01) |
| B32B 27/18 | (2006.01) |
| B32B 27/30 | (2006.01) |
| B32B 27/32 | (2006.01) |
| C08L 23/06 | (2006.01) |
| B32B 37/04 | (2006.01) |

(52) U.S. Cl.
CPC .............. *B32B 27/08* (2013.01); *B32B 27/18* (2013.01); *B32B 27/306* (2013.01); *B32B 27/32* (2013.01); *B32B 37/04* (2013.01); *C08L 23/06* (2013.01); *B32B 2250/03* (2013.01); *B32B 2250/05* (2013.01); *B32B 2250/242* (2013.01); *B32B 2250/246* (2013.01); *B32B 2270/00* (2013.01); *B32B 2307/412* (2013.01); *B32B 2307/72* (2013.01); *Y10T 428/24942* (2015.01); *Y10T 428/24975* (2015.01)

(58) Field of Classification Search
CPC .. C08L 23/06; C08L 2205/24; C08L 23/0815; B32B 2250/03; B32B 2250/05; B32B 2250/242; B32B 2250/246; B32B 2270/00; B32B 2307/412; B32B 2307/72; B32B 27/08; B32B 27/18; B32B 27/306; B32B 27/32; B32B 37/04

See application file for complete search history.

(56) References Cited

U.S. PATENT DOCUMENTS

| 4,740,415 A | 4/1988 | Hirschberger | |
| 5,085,927 A * | 2/1992 | Dohrer | B32B 27/08 428/220 |
| 2002/0127421 A1 | 9/2002 | Fukada et al. | |
| 2007/0066733 A1 | 3/2007 | Hanssen et al. | |
| 2007/0161739 A1 * | 7/2007 | Helland | C08K 3/346 524/451 |
| 2008/0020162 A1 * | 1/2008 | Fackler | B32B 5/18 428/36.5 |
| 2008/0139718 A1 | 6/2008 | Reyntjens et al. | |
| 2009/0208718 A1 | 8/2009 | Stoll et al. | |
| 2011/0019563 A1 | 1/2011 | Serrano Solsona et al. | |
| 2011/0160403 A1 | 6/2011 | Mavridis | |

FOREIGN PATENT DOCUMENTS

CN 101268131 A 9/2008

OTHER PUBLICATIONS

Office Action issue in corresponding European Application No. 12790076.9 dated Dec. 5, 2014 (5 pages).
English Translation of Office Action issued in corresponding Chinese Application No. 201280023068.0 dated Jul. 31, 2015 (13 pages).
International Search Report for corresponding International Application No. PCT/IB2012/000999, dated Oct. 5, 2012 (2 pages).

* cited by examiner

*Primary Examiner* — Lawrence Ferguson
(74) *Attorney, Agent, or Firm* — Osha Liang LLP

(57) ABSTRACT

The present disclosure provides a polymer composition comprising: at least one low density polyethylene (LDPE); at least one linear low density polyethylene (LLDPE); and a nucleating agent in an amount in the range of 1.5% to 3.0% w/w of the total weight of the composition; wherein the low density polyethylene and the linear low density polyethylene are in a ratio in the range of 1:1 to 3:1 w/w. The present disclosure also provides a polyethylene film comprising the polymer composition. The present disclosure further provides high clarity laminates comprising the polyethylene film. The present disclosure also provides a process for the preparation of the laminate.

6 Claims, 1 Drawing Sheet

POLYMER COMPOSITION FOR HIGH CLARITY LAMINATE, PROCESS OF MANUFACTURE AND APPLICATIONS THEREOF

TECHNICAL FIELD

The present disclosure relates to a polymer composition comprising an LDPE and an LLDPE with at least one nucleating agent. The disclosure also relates to a high clarity Polyethylene film, with less than 10%, more preferably less than 5% haze value. The films of the present disclosure can be made into a high clarity laminate. The disclosure further relates to an article made of such laminate, and its applications thereof. The disclosure further relates to a process of manufacturing said high clarity film.

BACKGROUND

Transparent Polyethylene films are desired for laminating into products that enhances the product appeal without compromising with the strength of such laminated articles. Low Density Polyethylene (LDPE) are known which can on its own can show haze value of around 12-15% when processed to 100μ film thickness. However, LDPE alone cannot be used in laminate for making tubes as it gives poor mechanical properties and inferior Heat seal characteristics. To overcome these short comings, suitable proportion of LLDPE has to be used in combination to LDPE. However, combination of LDPE: LLDPE in 100μ film give a haze value of around 12-15%. The similar haze value is noticed when the same polymer combination is used to make 50μ film. Clarifiers are used to decrease haze value in the Polypropylene polymer films. However, the use of clarifiers in PE polymers to provide a laminate of around thickness of 275μ is a challenge and not known in the filed. Therefore, there is a need to develop a PE polymer composition that would result in a laminate with high clarity, which will also have good mechanical strength.

SUMMARY

The present disclosure relates to a polymer composition comprising: at least one low density polyethylene (LDPE); at least one linear low density polyethylene (LLDPE); and a nucleating agent in an amount in the range of 1.5% to 3.0% w/w of the total weight of the composition; wherein the low density polyethylene and the linear low density polyethylene are in a ratio in the range of 1:1 to 3:1 w/w.

These and other features, aspects, and advantages of the present subject matter will become better understood with reference to the following description. This summary is provided to introduce a selection of concepts in a simplified form. This summary is not intended to identify key features or essential features of the disclosure, nor is it intended to be used to limit the scope of the subject matter.

BRIEF DESCRIPTION OF THE DRAWINGS

The above and other features, aspects, and advantages of the subject matter will be better understood with regard to the following description, appended claims, and accompanying drawings where:

DETAILED DESCRIPTION

Figure 1:
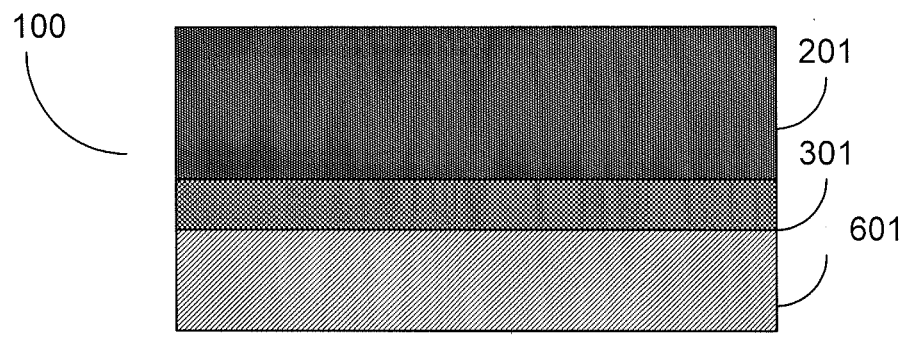
FIG. 1 illustrates a three layered laminate 100, according to an embodiment of the present disclosure.

The present disclosure provides a polymer composition comprising: at least one low density polyethylene (LDPE); at least one linear low density polyethylene (LLDPE); and a nucleating agent in an amount in the range of 1.5% to 3.0% w/w of the total weight of the composition; wherein the low density polyethylene and the linear low density polyethylene are in a ratio in the range of 1:1 to 3:1 w/w. The expression "at least one LDPE" and "at least one LLDPE" are understood to mean that one or more than one LDPE and one or more than one LLDPE can be used to prepare the polymer composition as specified.

An embodiment of the present disclosure provides the nucleating to be preferably a clarifier. Nucleating agents are generally inorganic materials with a small average particle size and a high melting point. When a nucleated resin is melted in an extruder, the nucleating agent remains solid and provides a site around which the polyethylene particles can form. Adding a nucleating agent to polyethylene increases crystal growth, and this growth occurs faster and at a higher temperature.

Clarifiers are organic, non-polymeric molecules. All clarifying agents also act as nucleating agents, but all nucleating agents are not necessarily clarifying agents. Clarifiers increase the clarity of polymers by reducing the size of the polymer spherulites. Smaller spherulites allow more light through the polymer, which decreases the haze of the part. Unlike nucleating agents, clarifiers are transparent, which also helps decrease haze values. In the present disclosure, clarifiers are therefore organic, non-polymeric molecules which are added to the polymer composition such that the laminates made therefrom exhibit haze values of less than 10%, preferably less than 5%.

Another embodiment of the present disclosure provides a polymer composition comprising at least one low density polyethylene (LDPE); at least one linear low density polyethylene (LLDPE) in a ratio of 1:1 w/w; and a nucleating agent in an amount of 2.5% w/w of the total weight of the composition.

The LDPE used in the present disclosure is advantageously of density around 0.918 g/cc to 0.935 g/cc, preferably 0.933 gm/cc and the density of the LLDPE used is advantageously around 0.918 g/cc to 0.940 g/cc, preferably 0.927 gm/cc. The LDPE and LLDPE used can be the commercially available polymers, such as, Exxon Mobil's "151BW" and "Exceed 1327CA". The clarifiers which are notably commercially available such as "HPN 20E" from Milliken, can be used as the nucleating agent in the present disclosure.

The ratio of the LDPE:LLDPE in the present disclosure is critical in order to achieve the high clarity property as well as good mechanical strength for varied end use. Higher amount of LDPE will result in poor mechanical properties of the resultant film made of the polymer composition. This means that if the amount (w/w) of low density polyethylene exceeds three times the amount (w/w) of linear low density polyethylene in the polymer composition, the laminate film will have poor mechanical properties. Similarly, the amount of the nucleating agent used in the composition is also critical in order to obtain the desired haze value of less than 10%, preferably less than 5%, besides rendering the invention cost-effective. Hence, the polymer composition of the present disclosure is a synergistic combination of the LDPE, the LLDPE and the nucleating agent, which is preferably a clarifier, in a specific range of amounts. The polymer composition provides Polyethylene (PE) films that are high clarity films with good mechanical strength that finds enhanced ranged of applications.

Another embodiment of the present disclosure provides a PE film manufactured from the polymer composition of the present disclosure, wherein layer ratio of said film ranges from 1:1:1 to 1:4:1 w/w. The thickness of the PE film prepared is advantageously in the range of 50μ to 100μ. The thickness of the film is manipulated depending on the type of the layer it is to be used in the preparation of a laminate. For example, for sealant layer, a less thick polymer layer is required, whereas for the print layer, a thicker polymer layer is desired.

PE blown films of the present disclosure are prepared from the polymer composition of the present disclosure are extruded and blown. Being co-extruded in three layers, the thickness of these films ranges from 50 to 150μ. The blown film is allowed to cool naturally and slit into the required width to be rolled and stored for further processing. Accurate temperature controls are essential in this process as a minor deviation could upset the process and in turn disturb the desired outcome. A heater melts the polymer composition from hopper and this molten material is passed through the screw to the die and punch area, where temperature-controlled air is blown to form the film.

Yet another embodiment of the present disclosure provides high clarity laminates prepared from the PE films of the present disclosure. An aspect of this embodiment provides a laminate of a polyethylene film comprising a polymer composition comprising at least one LDPE and at least one LLDPE in a ratio of 1:1 to 3:1 w/w; and a nucleating agent in an amount in the range of 1.5% to 3.0% w/w. This embodiment further provides the laminate wherein said polyethylene film is a three layered film with layer ratio of the polymer composition in the range of 1:1:1 to 1:4:1 w/w.

Still another embodiment of the present disclosure provides the laminate comprising a polyethylene film having a thickness of 100μ comprising a polymer composition comprising at least one LDPE and at least one LLDPE in a ratio of 1:1 to 3:1 w/w; and a nucleating agent in an amount in the range of 1.5% to 3.0% w/w; a low density polyethylene extrusion having a thickness of 20μ; and a high clarity polyethylene having a thickness of 50μ. The low density polyethylene extrusion having a thickness of 20μ is a polyethylene tie layer prepared through extrusion lamination process. This embodiment further provides the laminate, wherein said polyethylene film is a three layered film with layer ratio of the polymer composition in the range of 1:1:1 to 1:4:1 w/w.

A further embodiment of the present disclosure provides the laminate, comprising: a polyethylene film having a thickness of 100μ comprising a polymer composition comprising at least one LDPE and at least one LLDPE in a ratio of 1:1 to 3:1 w/w; and a nucleating agent in an amount in the range of 1.5% to 3.0% w/w; wherein said polyethylene film is a three layered film with layer ratio of the polymer composition in the range of 1:1:1 to 1:4:1 w/w; a low density polyethylene extrusion having a thickness of 20μ; a five layer film with ethylene vinyl alcohol in core having a thickness of 79μ; a low density polyethylene extrusion having a thickness of 20μ; and a high clarity polyethylene having a thickness of 50μ; wherein the low density polyethylene extrusion having a thickness of 20μ is a polyethylene tie layer prepared through extrusion lamination process. The laminates comprising the polymer composition of the present disclosure have a maximum thickness of 275μ.

A further embodiment of the present disclosure provides a process for the preparation of the three layered laminate, said process comprising: blowing a polymer composition comprising 1:1 w/w ratio of low density polyethylene and linear low density polyethylene with 2.5% nucleating agent w/w on the weight of the polymer composition to obtain a blown film; cooling the blown film and slitting into required width followed by heating to obtain a molten material; passing the molten material through a screw to a die and punch area, where temperature controlled air is blown to form a polyethylene film; extruding the polyethylene film by loading said film and a foil on two separate un-winders to obtain an extruded polyethylene film; passing the extruded polyethylene film between a low density polyethylene extrusion and a high clarity polyethylene and fusing them together to obtain the three layered laminate.

Yet another embodiment of the present disclosure provides a process for the preparation of the three layered laminate, said process comprising: blowing a polymer composition comprising 3:1 w/w ratio of low density polyethylene and linear low density polyethylene with 2.5% nucleating agent w/w on the weight of the polymer composition to obtain a blown film; cooling the blown film and slitting into required width followed by heating to obtain a molten material; passing the molten material through a screw to a die and punch area, where temperature controlled air is blown to form a polyethylene film; extruding the polyethylene film by loading said film and a foil on two separate un-winders to obtain an extruded polyethylene film; passing the extruded polyethylene film between a low density polyethylene extrusion and a high clarity polyethylene and fusing them together to obtain the three layered laminate.

Still another embodiment of the present disclosure provides a process for the preparation of the five layered laminate, said process comprising: blowing a polymer composition comprising 1:1 w/w ratio of low density polyethylene and linear low density polyethylene with 2.5% nucleating agent w/w on the weight of the polymer composition to obtain a blown film; cooling the blown film and slitting into required width followed by heating to obtain a molten material; passing the molten material through a screw to a die and punch area, where temperature controlled air is blown to form a polyethylene film; extruding the polyethylene film by loading said film and a foil on two separate un-winders to obtain an extruded polyethylene film; passing the extruded polyethylene film between a low density polyethylene extrusion and a high clarity polyethylene and fusing them together to obtain a three layered laminate; fusing the three layered laminate with a five layer film with ethylene vinyl alcohol in core and a low density polyethylene extrusion to obtain the five layered laminate.

A further embodiment of the present disclosure provides a process for the preparation of the five layered laminate, said process comprising: blowing a polymer composition comprising 3:1 w/w ratio of low density polyethylene and linear low density polyethylene with 2.5% nucleating agent w/w on the weight of the polymer composition to obtain a blown film; cooling the blown film and slitting into required width followed by heating to obtain a molten material; passing the molten material through a screw to a die and punch area, where temperature controlled air is blown to form a polyethylene film; extruding the polyethylene film by loading said film and a foil on two separate un-winders to obtain an extruded polyethylene film; passing the extruded polyethylene film between a low density polyethylene extrusion and a high clarity polyethylene and fusing them together to obtain a three layered laminate; fusing the three layered laminate with a five layer film with ethylene vinyl alcohol in core and a low density polyethylene extrusion to obtain the five layered laminate.

FIG. 1 illustrates an exemplary structure of the three layer laminate 100, in accordance with an embodiment of the present disclosure. In said embodiment, as mentioned earlier, the three layered laminate 100 is formed having a three-layered structure. The first layer 201 comprises of a polymer composition comprising at least one LDPE, and at least one LLDPE in a ratio of 1:1 to 3:1 w/w; and a nucleating agent in an amount in the range of 1.5% to 3.0% w/w. The second layer 301 comprises low density polyethylene extrusion. The third layer 601 comprises high clarity polyethylene.

In an embodiment the thickness of the first layer 201 is about 100μ, the thickness of second layer 301 is about 20μ, and the thickness of third layer 601 is about 50μ.

Figure 2:
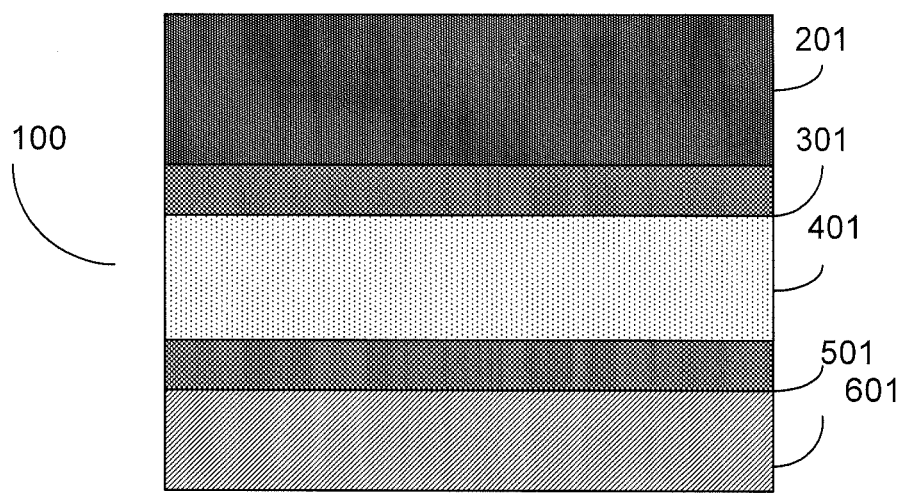
FIG. 2 illustrates a five layer laminate 100, according to an embodiment of the present disclosure.

FIG. 2 illustrates an exemplary structure of five layered laminate 100, in accordance with an embodiment of the present disclosure. In laminate 100, the first layer 201 comprises of a polymer composition comprising at least one LDPE, and at least one LLDPE in a ratio of 1:1 to 3:1 w/w; and a nucleating agent in an amount in the range of 1.5% to 3.0% w/w; the second layer 301 comprises low density polyethylene extrusion; the third layer 401 comprises ethylene vinyl alcohol (EVOH); the fourth layer 501 comprises a low density polyethylene extrusion; and the fifth layer 601 comprises a high clarity polyethylene.

In an embodiment the thickness of the first layer 201 is about 100μ, the thickness of second layer 301 is about 20μ, the thickness of third layer 401 is about 79μ, the thickness of fourth layer 501 is about 20μ, and the thickness of fifth layer 601 is about 50μ.

Another embodiment of the present disclosure further provides articles made of the laminates of the present disclosure. The articles comprising the laminate have a haze value of less than 10%, preferably less than 5%, besides rendering the disclosure cost-efficient. The high clarity laminates are made into transparent or near transparent tubes that have enhanced product appeal.

An important feature of the disclosure is the specific polymer composition and the PE film with specific thickness as mentioned in the foregoing paragraphs, which when laminated to form articles with the desired mechanical strength, besides having glass like clarity.

EXAMPLES

The disclosure will now be illustrated with working examples, which is intended to illustrate the working of the disclosure and not intended to take restrictively to imply any limitations on the scope of the present disclosure. Other embodiments are also possible.

Example 1

100μ blown film with 1:1 Exxon Mobil's 151BW: Exceed 1327CA is used with 2.5% HPN 20E from Milliken w/w on the weight of the polymer. The three layers blown film is made with the polymer composition same in each layer with 1:3:1 layer ratio.

Example 2

50μ Polyethylene film is made by the process as in example 1.

Example 3

5 layer blown film is prepared with EVOH as core film. The total thickness of the 5 layer film is 79μ with 10μ Ethylene Vinyl Alcohol (EVOH). The laminate prepared is of following structure: 100μ High Clarity PE//20μ LDPE Extrusion//79μ 5 layer film with EVOH in core//20μ LDPE Extrusion//50μ High Clarity PE The 20μ LDPE extrusion is a polyethylene tie layer prepared through extrusion lamination process.

Advantages

The previously described versions of the subject matter and its equivalent thereof have many advantages, including those which are described below:
1. The present disclosure provides high clarity laminates of thickness of as high as 275μ that has glass-like clarity and good mechanical strength.
2. The present disclosure enhances the product appeal.
3. The present disclosure also provides the high clarity laminates in a cost effective way.

Although the subject matter has been described in considerable detail with reference to certain preferred embodiments thereof, other embodiments are possible. As such, the spirit and scope of the disclosure should not be limited to the description of the preferred embodiment contained therein.

We claim:
1. A laminate of a polyethylene film comprising three chemically distinct polyolefin layers, comprising:
   a polyethylene film layer having a thickness of 100μ comprising a polymer composition comprising at least one LDPE and at least one LLDPE in a ratio of 1:1 to 3:1 w/w; and a nucleating agent in an amount in the range of 1.5% to 3.0% w/w;
   a low density polyethylene extrusion layer having a thickness of 20μ; and
   a high clarity polyethylene layer having a thickness of 50μ;
   wherein the low density polyethylene extrusion layer having a thickness of 20μ is a polyethylene tie layer prepared through extrusion lamination process, wherein the layer ratio of the layers of the film is in the range 1:1:1 to 1:4:1 w/w.
2. The laminate as claimed in claim 1, wherein said polyethylene film layer is a three layered film with layer ratio of the layers of the film is in the range of 1:1:1 to 1:4:1 w/w.
3. The laminate as claimed in claim 1, comprising:
   a polyethylene film layer having a thickness of 100μ comprising a polymer composition comprising at least one LDPE and at least one LLDPE in a ratio of 1:1 to 3:1 w/w; and a nucleating agent in an amount in the range of 1.5% to 3.0% w/w; wherein said polyethylene film is a three layered film with layer ratio of the polymer composition in the range of 1:1:1 to 1:4:1 w/w;
   a low density polyethylene extrusion layer having a thickness of 20μ;
   a five layer film with ethylene vinyl alcohol in core having a thickness of 79μ;
   a low density polyethylene extrusion layer having a thickness of 20μ; and
   a high clarity polyethylene layer having a thickness of 50μ;

wherein the low density polyethylene extrusion layer having a thickness of 20μ is a polyethylene tie layer prepared through extrusion lamination process.

4. The laminate as claimed in claim 1, wherein said laminate has a thickness in the range of 170μ to 269μ.

5. An article comprising the laminate as claimed in claim 1, said article having a haze value of less than 10%.

6. The laminate as claimed in claim 1, wherein said laminate has a thickness in the range of 170μ to 269μ.

\* \* \* \* \*